(12) United States Patent
Palovuori

(10) Patent No.: US 7,114,809 B2
(45) Date of Patent: Oct. 3, 2006

(54) APPARATUS BASED ON SHUTTER FUNCTION FOR PROJECTION OF A STEREO OR MULTICHANNEL IMAGE

(76) Inventor: Karri Palovuori, Linnainmaanraitti 18 A 5, FIN-33580, Tampere (FI)

( * ) Notice: Subject to any disclaimer, the term of this patent is extended or adjusted under 35 U.S.C. 154(b) by 0 days.

(21) Appl. No.: 10/481,259

(22) PCT Filed: Jun. 18, 2002

(86) PCT No.: PCT/FI02/00531

§ 371 (c)(1),
(2), (4) Date: Jun. 30, 2004

(87) PCT Pub. No.: WO03/003750

PCT Pub. Date: Jan. 9, 2003

(65) Prior Publication Data

US 2004/0233276 A1    Nov. 25, 2004

(30) Foreign Application Priority Data

Jun. 18, 2001    (FI) .................................. 20011293

(51) Int. Cl.
*G03B 21/00* (2006.01)
*G02B 27/22* (2006.01)
*H04N 13/04* (2006.01)
*H04N 15/00* (2006.01)

(52) U.S. Cl. .............................. 353/7; 359/464; 348/56
(58) Field of Classification Search ............... 353/7, 353/8, 10, 88, 94; 359/462, 464, 465, 466, 359/472, 478; 348/56; 352/63, 134
See application file for complete search history.

(56) References Cited

U.S. PATENT DOCUMENTS 1,631,240 A    6/1927    Amet (Continued)

FOREIGN PATENT DOCUMENTS

CH    647605    1/1985

(Continued)

*Primary Examiner*—Christopher Mahoney
(74) *Attorney, Agent, or Firm*—Venable LLP; Eric J. Franklin

(57) ABSTRACT

An apparatus for projecting a moving or still stereo or multichannel image. At least a first and at least a second video projector, or the like, project images intended for the left and the right eye of a viewer alternately in time and in synchronization with the function of shutter glasses or the like worn by the viewer. The video projectors are provided with a shutter/several shutters to prevent the projection of an image, if necessary. The control of the shutter is arranged in synchronization with the showing of the images in the following manner. When the right-eye shutter of the shutter glasses or the like worn by the viewer is open, the shutter in connection with at least the second projector projecting the image intended for the left eye is/are controlled to be shut. Correspondingly, when the left-eye shutter of the shutter glasses or the like worn by the viewer is open, the shutter in connection with at least the first projector projecting the image intended for the right eye is/are controlled to be shut. The invention enables the projection of a high-quality stereo image by means of affordable video projectors, for example liquid crystal video projectors functioning at the normal image frequency.

16 Claims, 5 Drawing Sheets

U.S. PATENT DOCUMENTS

| | | | |
|---|---|---|---|
| 1,844,946 A * | 2/1932 | Doolittle | 352/134 |
| 3,334,816 A | 8/1967 | Mizuno | |
| 3,737,567 A | 6/1973 | Kratomi | |
| 4,399,456 A | 8/1983 | Zalm | |
| 4,401,368 A | 8/1983 | Drechsel et al. | |
| 4,736,246 A | 4/1988 | Nishikawa | |
| 4,834,540 A * | 5/1989 | Totsuka et al. | 356/401 |
| 4,934,824 A * | 6/1990 | Ling | 352/57 |
| 4,955,540 A | 9/1990 | Fuller et al. | |
| 4,971,435 A * | 11/1990 | Shaw et al. | 352/63 |
| 5,002,387 A * | 3/1991 | Baljet et al. | 352/63 |
| 5,067,653 A | 11/1991 | Araki et al. | |
| 5,119,189 A * | 6/1992 | Iwamoto et al. | 348/47 |
| 5,239,372 A | 8/1993 | Lipton | |
| 5,245,319 A | 9/1993 | Kilian | |
| 5,265,802 A | 11/1993 | Hobbs et al. | |
| 5,270,752 A | 12/1993 | Kataoka et al. | |
| 5,303,083 A * | 4/1994 | Blanchard et al. | 359/497 |
| 5,402,191 A | 3/1995 | Dean et al. | |
| 5,621,424 A | 4/1997 | Shimada et al. | |
| 5,654,749 A | 8/1997 | Kanno | |
| 5,685,625 A * | 11/1997 | Beaver | 353/28 |
| 5,726,703 A | 3/1998 | Izawa et al. | |
| 5,967,653 A * | 10/1999 | Miller et al. | 362/580 |
| 5,989,128 A | 11/1999 | Baker et al. | |
| 6,092,900 A | 7/2000 | Diedrich et al. | |
| 6,377,230 B1 * | 4/2002 | Yamazaki et al. | 348/56 |
| 2004/0001182 A1 | 1/2004 | Dyner | |
| 2004/0233276 A1 | 11/2004 | Palovuori | |

FOREIGN PATENT DOCUMENTS

| | | |
|---|---|---|
| DE | 476372 | 5/1929 |
| DE | 3130638 A1 | 2/1983 |
| DE | 3828262 A1 | 12/1989 |
| EP | 0502511 A2 | 9/1992 |
| FR | 2773229 | 7/1999 |
| GB | 2220278 A | 1/1990 |
| JP | 7056235 | 3/1995 |
| JP | 07284128 A | 10/1995 |
| JP | 10023464 A | 1/1998 |
| JP | 10336699 A | 12/1998 |
| JP | 2001125042 | 5/2001 |
| WO | WO 96/32665 | 10/1996 |
| WO | WO 98/15128 | 4/1998 |
| WO | WO 98/35264 | 8/1998 |
| WO | WO 00/55687 | 9/2000 |

* cited by examiner

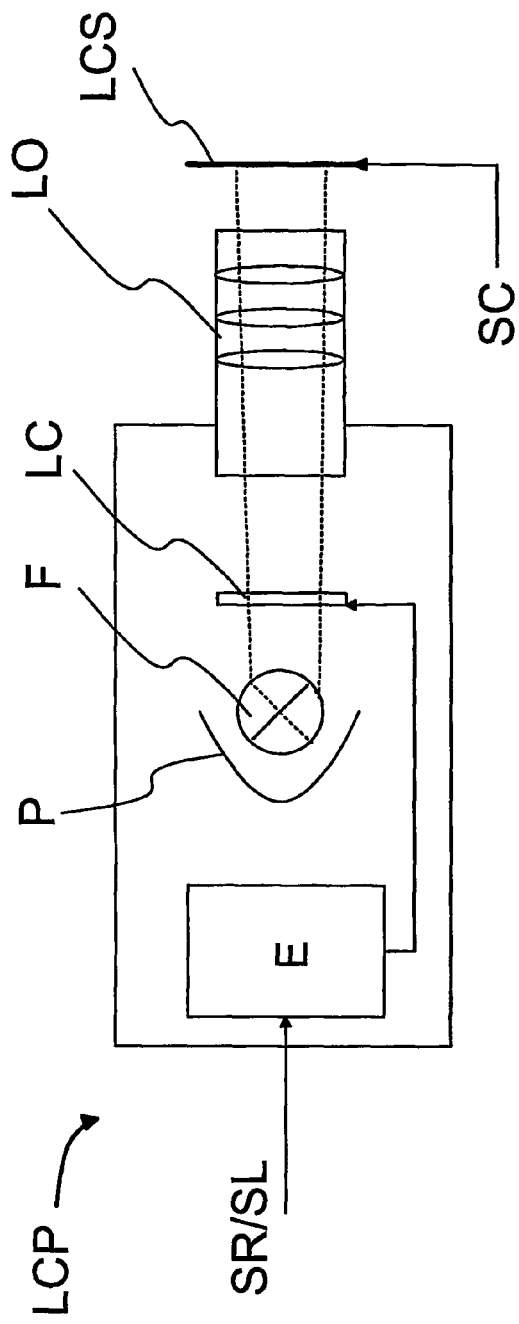
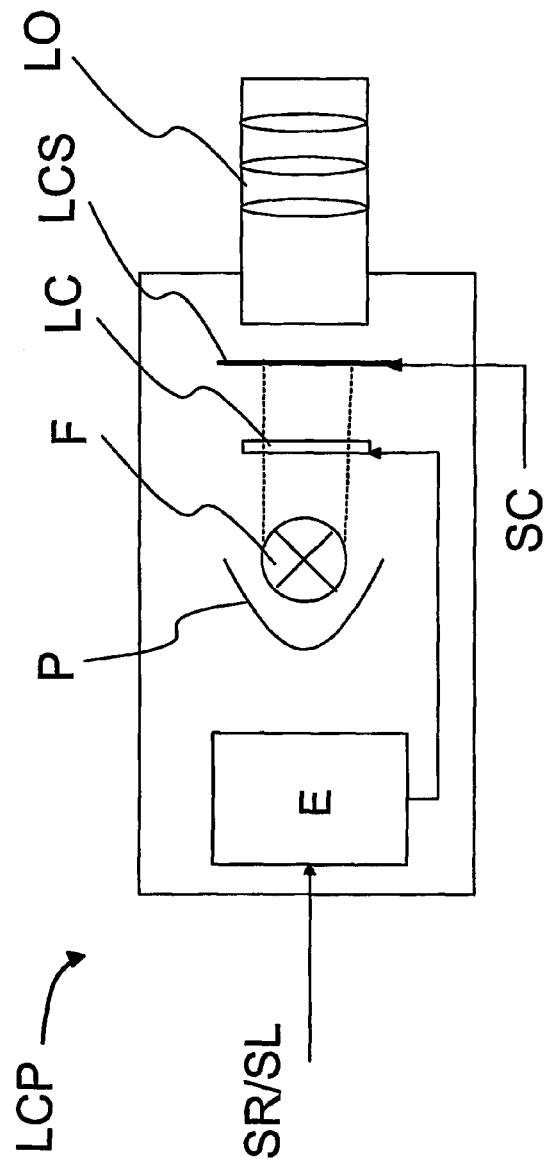
Fig. 3
Fig. 4

APPARATUS BASED ON SHUTTER FUNCTION FOR PROJECTION OF A STEREO OR MULTICHANNEL IMAGE

FIELD OF THE INVENTION

The present invention relates to an apparatus for projection of a stereo or multichannel image.

BACKGROUND OF THE INVENTION

Depth perception, or the capacity to perceive the environment in three dimensions, is based on the fact that the right and the left eye of a viewer look at the environment from a slightly different point and from a slightly different angle. Therefore, the images perceived by the right and the left eye differ from each other to some extent, and the difference between said images makes it possible to perceive the surrounding space in three dimensions.

It is known from prior art to record images in such a way that the 3-dimensional impression corresponding to the image recording situation is transmitted to the viewing person. These techniques are generally referred to as stereo imaging, and they are thus, in one way or another, based on the fact that a slightly different image is transmitted to the viewer's right and left eye.

One well-known example of the use of stereo imaging is Viewmaster™ viewing devices which make it possible to look at still images recorded on a photographic film separately for the right and the left eye by means of a viewing device to be placed in front of the viewer's eyes. The stereo images are recorded on the film by means of a special camera using two separate objective lenses.

Stereo imaging is used not only for presenting still images but also moving images.

From prior art, solutions are known for projecting a stereo image onto a screen by means of a film projector, wherein the same image can be looked at by several viewers, for example in a cinema. In this case, the viewers wear special eyeglasses to prevent the image intended for the right eye from being visible to the left eye, and vice versa. In the case of film projectors, the function of said glasses may be based on either polarization or colour filtering; in other words, the images intended for the right and the left eyes are encloded differently by means of polarization or colour coding. The image to be projected on the screen simultaneously includes superimposed images which have been encoded differently for the right and the left eye and from which, thanks to the special eyeglasses worn by the viewer, different images are conveyed to the viewer's right and left eye, to produce a 3-dimensional impression.

At present, when image material is primarily in electronic format and can thus be reproduced, for example, by means of a video signal, video projectors are used instead of film projectors to project a stereo image onto a screen or another projection surface. The image material to be presented by video projectors may be a stereo image recorded by special cameras with two objective lenses, or an image edited from an ordinary image by means of image processing, or also a stereo image developed in a completely "artificial" manner by means of a computer. At present, the projection of stereo images is mostly used in the reproduction of image material produced by a computer, for example to create various virtual environments.

A stereo image can be transferred and reproduced in electronic format by means of a special stereo video signal, in which the images intended for the right and the left eye are arranged to alternate one after the other in time. Consequently, the image frequency of the stereo video signal is double compared to the image frequency of a conventional video signal, if the image frequency of the images intended for the right and the left eye is to be maintained at the normal image frequency level (25 or 30 images per second).

Consequently, when said stereo video image is presented to a viewer by means of a wide screen television projector, the images intended for the right and the left eye are thus projected in an alternating manner one after the other in time. To control these successive images to be perceived in the correct manner by the viewer's right and left eye, the viewer wears so-called shutter glasses, whose operation is synchronized for showing images in succession. The shutter of the shutter glasses in front of the right eye is shut when the image intended for the left eye is projected, and in a corresponding manner, the shutter in front of the left eye is shut when the image intended for the right eye is projected. The operation of the shutter glasses is typically based on the use of liquid crystal shutters.

When a single video projector is used for projecting a stereo video signal, this will set considerable demands on the video projector, because the video projector must now, in principle, be capable of operating at a double image frequency (50 or 60 images per second) compared to the normal image frequency (25 or 30 images per second). When a computer image is being displayed, the image frequency established for images intended for one eye is even higher than for normal video images, 60 images per second, wherein the image frequency for stereo images becomes as high as 120 images per second.

Because of this, single video projectors which are suitable for projecting a stereo video signal are thus based on the CRT (cathode ray tube) technology, well known as such, which makes such high image frequencies possible but which also makes the structure of projectors relatively complex and thereby expensive. For example, liquid crystal video projectors, which are less expensive and otherwise considerably simpler from the technical point of view, cannot be used for this purpose in a corresponding manner, because due to the lag of liquid crystal matrix elements they do not have the capacity for the sufficiently high projection rates required by the double image frequency.

For the above-mentioned reason, solutions have also been developed, in which image signals intended for the right and the left eye are separated from the stereo video signal to two different video projectors. Thus, instead of special CRT projectors, the video projectors used can be less expensive projectors operating at a normal image frequency, for example projectors based on the liquid crystal matrix. The images of said two projectors are focused on top of each other, superimposed simultaneously by crosswise light polarizations, and the image thus formed is viewed through eyeglasses polarized crosswise differently for the right and the left eye. Such an arrangement is known, for example, from the publication WO 00/55687.

However, such solutions of prior art, using two projectors, are limited expressly to the use of polarization (or colour filtering) to separate the images intended for the right and the left eye from each other. In other words, in these systems, the images intended for the right and the left eye are projected to the viewer simultaneously and not sequentially in time as in systems using shutter glasses.

However, the use of polarization or colour filtering involves obvious disadvantages when compared with methods based on shutter glasses. In systems based on polarization, for example, tilting of the head by the viewer will change the filtering capacity of the polarization glasses worn by him/her. This is problematic when a stereo image is used, for example, to create a virtual environment, in which virtual environment the viewer is expected to move in relation to the stereo image projected to him/her. Both in systems using polarization and in those using colour filtering, the natural reproduction of colours is naturally poorer than in systems based on shutter glasses, in which the colour reproduction is substantially neutral when the liquid crystal shutters of the shutter glasses are open. Also, both the polarization and the colour filters significantly reduce the brightness of the image perceived by the viewer, because the image is now typically both projected and viewed through optical filters with a limited transmission.

In systems based on shutter glasses and using two projectors, the problem in practice is that the operation of the projectors should be precisely synchronized with each other to achieve a high image quality. In other words, the projector showing the image intended for the right eye must, in principle, not project the image when the other projector is projecting the image intended for the left eye. In spite of liquid crystal shutter glasses, or the like, worn by the viewer, if the video projector producing the image intended for the left eye projects the image or otherwise emits light when the shutter of the shutter lense in front of the right eye is open, it can also be seen by the right eye, because in this case polarization or colour filtering is thus not used for the encoding of images. The above-mentioned unwanted "leaking" of the image or light crosswise to the other eye will naturally impair the depth impression and contrast of the stereo image as well as cause flicker of the image.

In liquid crystal video projectors, in which the light transmitted by a light source penetrates the liquid crystal matrix, and the image formed onto the liquid crystal matrix is projected by means of lense optics further to be superimposed on a projection surface, the limited rate of operation of the liquid crystal matrix will make the above-described synchronization of the images more difficult. Furthermore, a perfect contrast cannot be produced by the liquid crystal matrix, whose operation in the projector can be compared with the function of a slide in a slide projector. In other words, even though the aim is to control the liquid crystal matrix to be non-transparent, i.e. to reproduce a completely black image, a given portion of the light from the light source is always passed through the liquid crystal matrix and further onto the screen. This unwanted light impairs the quality of the stereo image produced.

Because of these facts, the production of a high-quality stereo image by means of two separate video projectors and the technique based on shutter glasses always requires, in practice, the use of video projectors which are of a relatively high quality and thereby relatively expensive. This is emphasized particularly in the reproduction of a stereo image produced by means of a computer, in which the total image frequency of the stereo image is even higher than that of a stereo image formed of a normal video image. Thus, in practice, the advantage to be achieved in the reproduction of a stereo image by means of two projectors in relation to the use of one special projector based on the CRT technology remains small, or, accordingly, the quality of the stereo image remains significantly poorer than the image quality achieved with the special projector.

SUMMARY OF THE INVENTION

The primary aim of the present invention is to present an apparatus which makes it possible to project a high-quality stereo image by using inexpensive video projectors, such as liquid crystal video projectors, in such a way that, contrary to the prior art, the separation of the images for the viewer's right and left eye can, however, be performed by using technology expressly based on shutter glasses.

By means of the invention, together with the use of the shutter glasses, it is possible to achieve a clearly better image quality, for example greater image brightness and more natural colour reproduction, than in systems of prior art which are based on polarization or colour filtering.

By means of the invention, it is possible to avoid, efficiently and with low costs, the problems which would otherwise impair the quality of the stereo image and which are due, for example, to the synchronization of the projectors projecting the image to the right and the left eye, and/or the insufficient contrast when the shutter-glass technique is used.

The basic idea of the invention is to use a single or multiple separate shutter means, synchronized with the operation of the shutter glasses worn by the viewer, and thereby synchronized for the projection of images intended for the right and the left eye, in connection with projectors used for superimposing a stereo image. If necessary, the shutter means can be used to prevent the propagation of the image projected by a single projector or of other light to be perceived by the viewer.

The shutter means according to the invention are efficient in preventing the unwanted cross-"leaking" of the image between the viewer's right and left eye, caused by the imperfect synchronization of the projectors and/or an imperfect contrast. The shutter means according to the invention is synchronized in such a way that when the shutter for the right eye in the shutter glasses worn by the viewer is open, the shutter means in connection with the projector projecting the image intended for the left eye is controlled to be shut, and, respectively, when the left shutter of the shutter glasses is open, the shutter in connection with the projector intended for the right eye is shut. This arrangement will efficiently prevent the perception of an image intended for the left eye by the viewer's right eye, and vice versa, in all situations (for example, imperfect synchronization of projectors). Furthermore, even if the projector, as such, were not capable of producing a perfect contrast, i.e., also a completely "black" image, if necessary, the shutter means of the invention will efficiently prevent the entry of stray light, or the like, developing in that situation, on a screen or another projection surface.

In an advantageous embodiment of the invention, the shutter means used is a rotating disc equipped with one or more apertures and placed in front of the projectors. Such a mechanical shutter is technically easy and inexpensive to implement, and it makes 100% and 0% of light transmission possible when it is open and shut, respectively.

In another embodiment of the invention, the shutter means used in connection with the projectors are shutters which are based on liquid crystals and which can be either absorptive or dispersive by their principle of operation. Liquid crystal shutters have the advantage that no mechanical motion will be needed to implement the shutter operation, and if desired, the shutter may also be placed inside the housing of the projector.

In yet another embodiment of the invention, the light source of the single projector is replaced with a light conductor which conveys light to the projector from a separate light source placed outside said projector. This embodiment has the advantage that by using light conductors, it is now possible to convey light from one light source to several projectors, and the shutter function according to the invention can be easily arranged in connection with said separate light source, for example by using a solution based on a mechanical rotating disc.

The following more detailed description of the invention by means of examples will more clearly illustrate, for anyone skilled in the art, advantageous embodiments of the invention as well as advantages to be achieved with the invention in relation to prior art.

BRIEF DESCRIPTION OF THE DRAWINGS

In the following, the invention will be described in more detail with reference to the appended drawings, in which FIG. 3 illustrates, in principle, a way of using a liquid crystal shutter in connection with a video projector, to achieve the shutter function according to the invention, FIG. 4 illustrates, in principle, another way of using a liquid crystal shutter in connection with a video projector, to achieve the shutter function according to the invention.

DETAILED DESCRIPTION OF THE INVENTION

Figure 1:
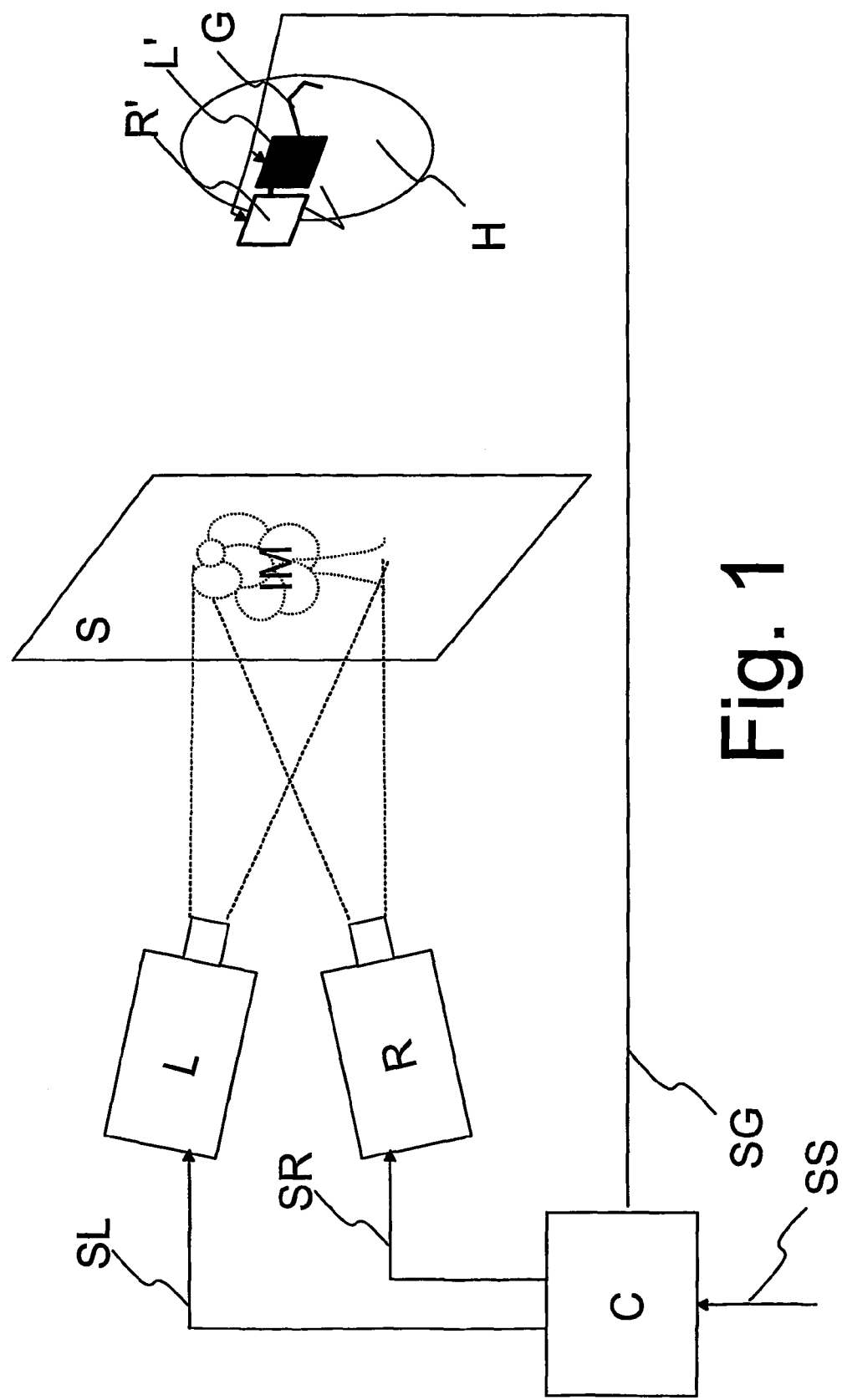
FIG. 1 shows, in principle, the projection of a stereo image by using two video projectors according to prior art.

FIG. 1 shows, in principle, the projection of a stereo image according to prior art, when two separate video projectors are used in combination with shutter glasses.

Image signals SR and SL intended for the right and the left eye are separated from a stereo video signal SS, for two separate video projectors R and L. This can be implemented by using a decoder C, decoders being commercially available and their function being described, for example, in patent publication WO 00/55687. The right video projector R and the left video projector L project an image IM onto a screen or another projection surface S in such a way that the images intended for the right and the left eye of a viewer H are projected one after another in time. To control these temporally successive images to be perceived by the right and left eye of the viewer H in the correct manner, the viewer H wears so-called shutter glasses G, whose operation is synchronized by means of a signal SG for the reproduction of said successive images. The signal SG is preferably generated in a decoder C.

The shutter L' of the shutter glasses G in front of the left eye is shut when the image intended for the right eye is projected with the projector R, and in a corresponding manner, the shutter R' in front of the right eye is shut when the image intended for the left eye is projected with the projector L. The function of the shutter glasses G is well known, as such, from prior art and is typically based on the use of liquid crystal shutters.

Figure 2:
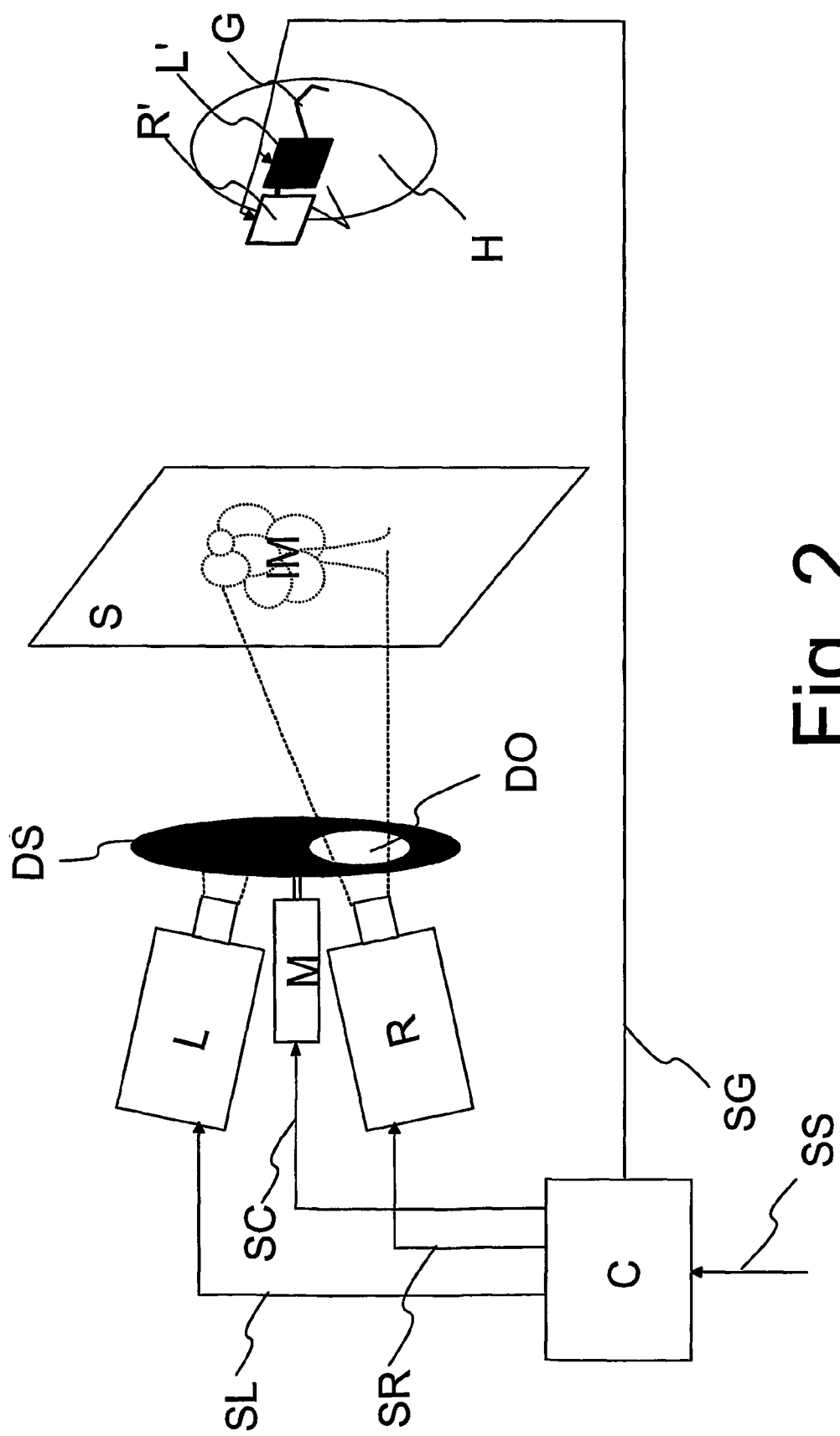
FIG. 2 illustrates, in principle, the use of a shutter means according to the invention in a situation corresponding to that of FIG. 1.

FIG. 2 illustrates, in principle, the use of a separate shutter means DS according to the invention in a situation corresponding to FIG. 1 to improve the quality of the stereo image and to make it possible to use e.g. inexpensive liquid crystal video projectors as the projectors R, L. The operation of the rotating shutter disc DS used as a mechanical shutter is synchronized by means of a signal SC, which controls the rotational speed of the motor M rotating said shutter disc and is preferably obtained from the decoder C, in the following way.

When the shutter R' for the right eye in the shutter glasses G of the viewer H is open, the shutter disc DC prevents light emitted by the projector L and intended for the left eye from propagating to a screen S but, correspondingly, allows the showing of the image projected by the projector R, thanks to an aperture DO in the shutter disc DS. In a corresponding manner, when the left shutter L' in the shutter glasses G is open, the shutter disc DS prevents the showing of the image projected by the projector R on the screen S. Consequently, the operation of the shutter disc DS is synchronized for the operation of both the projectors R and L and the shutter glasses G.

In all situations, the above-described arrangement of the invention effectively prevents the perception of the image intended for the left eye by the viewer's right eye, and vice versa. That is, for example in a situation in which the synchronization of the signals SL and SR is not quite perfect and/or the projectors R and L are, due to their principle of operation, incapable of producing a perfect contrast, or a completely "black" image, if necessary, the solution of the invention prevents the unwanted cross-"leaking" of an image or light between the viewer's right and left eye.

The invention alleviates considerably the demands set on the synchronization of images produced by the right R and left L projectors. When using the shutter means according to the invention, the projectors R and L can, in principle, also be arranged to project the image in a continuous manner, wherein the shutter means DS together with the shutter glasses G selects, from the images projected by the projectors R, L, each time that image intended for the right or left eye which is intended to be seen by the viewer H.

With reference to FIG. 2, it is obvious that different from the figure, the aperture DO in the shutter disc DS may also have another shape than the circular shape. The shape of the aperture DO may, for example, correspond to a given sector portion of the disc DS. If necessary, the disc DS may also comprise several apertures DO.

Differing from that shown in FIG. 2, it is obvious that the separate video signals SR and SL intended for the right R and the left L projectors may also be generated in another way than by decoding them separately from the stereo video signal SS. The video signals SR, SL may be generated directly, for example by a computer, by modifying a normal moving or still image by various image processing means which are known as such. The video signals SR, SL may also be generated from the beginning by means of a computer, for example as pure computer animations. Such a stereo image produced by a computer can be used, for example, in computer games or for creating various virtual environments and spaces. From the point of view of the invention, it is thus not essential how the video signals SR and SL needed for projecting the stereo image and intended separately for the right and the left eye are produced. From the point of view of the invention, the video signals SR, SL do not necessarily need to be combined into one stereo video signal SS at any stage. The image frequency of the video signals SR, SL may vary according to each application, and it may thus be higher or lower than the image frequencies applied in normal TV application (25 or 30 images per second).

It should also be mentioned that there are, at present, commercially available display adapters or the like which are to be connected to a personal computer and which comprise several separate video outputs. Said video outputs can be programmed to produce images different from each other, which suitably generated images can be further used to produce a stereo image. Such display adapters can be used for the control of normal video projectors and further in combination with the solution according to the invention to produce a high-quality stereo image for various uses.

The invention is not limited solely to the use of the mechanical shutter DS shown in FIG. 2, although a mechanical shutter, and particularly said shutter based on a rotating disc, is an advantageous solution as such, thanks to its simple implementation. The mechanical shutter makes 100% and 0% transmission of light possible when it is open and shut, respectively.

FIGS. 3 and 4 show some alternative embodiments of the invention in principle. Said figures show, in principle, the most essential functional components of a so-called liquid crystal video projector LCP which forms an image by means of a liquid crystal matrix LC. In the liquid crystal video projector LCP, the light emitted by a light source F is conducted, preferably by means of a reflector P, through the liquid crystal matrix LC and lense optics LO, to be reflected on a projection surface. The liquid crystal matrix LC, whose function in the projector can be compared with the function of a slide in a slide projector, is electrically controlled by electronics E to produce a desired image from a video signal SR or SL input in the projector. To produce a stereo image, two separate liquid crystal video projectors LCP are used, of which one is supplied the video signal SR and the other the video signal SL, as shown in FIGS. 1 and 2.

In FIG. 3, the shutter function according to the invention is implemented by means of a liquid crystal shutter LCS which is arranged directly in front of the liquid crystal video projector in the direction of light propagation and whose operation is controlled by means of a signal SC in synchronization with the operation of the shutter glasses G worn by the viewer. Naturally, it is obvious that in the case of projectors intended for the right and the left eye, said control signal SG is now generated separately for each projector.

In FIG. 4, accordingly, the shutter function according to the invention is implemented by arranging the liquid crystal shutter LCS inside the projector LCP, directly after the liquid crystal matrix forming the image to be projected, in the direction of light propagation.

The liquid crystal shutters LCS to be used according to the invention may be of any type known as such and suitable for the purpose. The operation of the liquid crystal shutters LCS may thus be based on either light absorption, dispersion, and/or reflection.

It is obvious that the shutter function according to the invention may also be arranged in other points on the light propagation path than those shown in FIGS. 2–4. In principle, the shutter function can be arranged at any point between the light source F of the video projector and the projection surface S, at which point the used shutter means can, if necessary, prevent the light emitted by said projector from propagating to the projection surface S, to be perceived by the viewer H. For example, it is possible to place the liquid crystal shutter LCS or also a suitable mechanical shutter between the light source F and the liquid crystal matrix LC.

The liquid crystal shutters LCS have the advantage that no mechanical motion is needed to implement the shutter function, and the shutter means can thus be easily placed inside the housing of the video projectors LCP, if necessary.

In addition to the above-described mechanical rotating disc DS and liquid crystal shutters LCS, the shutter means used can also be any other mechanical, micromechanical or electro-optical shutter mechanism which is electrically controllable and has the capacity for a sufficiently high operating frequency.

Figure 5:
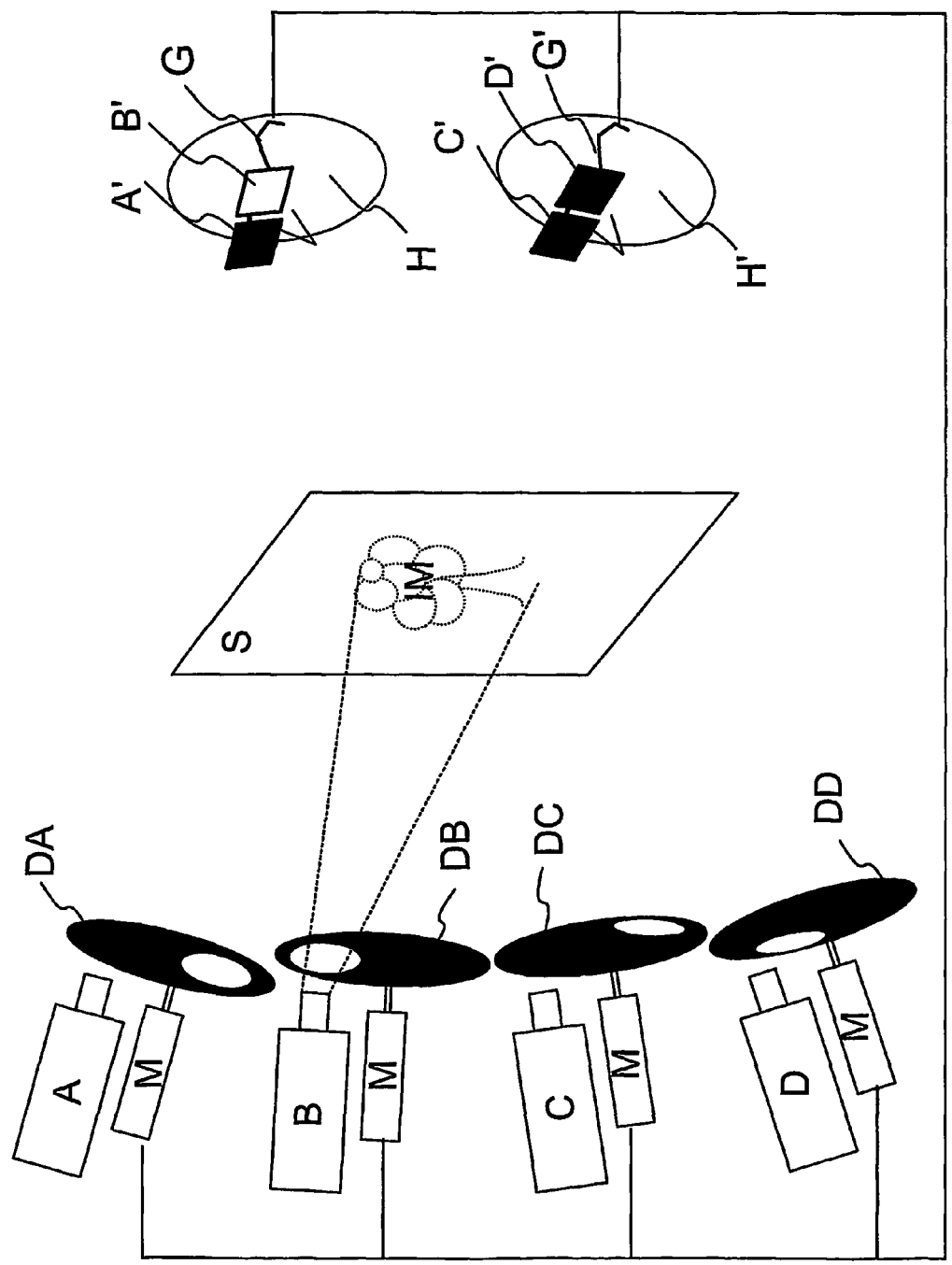
FIG. 5 illustrates the method of the invention applied in the projection of a stereo image to be produced for several viewers individually.

Moreover, the invention is not limited to the production of a stereo image intended for one viewer only. FIG. 5 illustrates the method of the invention applied in the projection of a stereo image to be produced for several viewers individually.

In FIG. 5, the video projectors A and B produce a stereo image intended for a viewer H from video signals SR and SL. The operation of the shutter means DA and DB is, according to the invention, synchronized with the operation of the shutters A', B' of the shutter glasses G worn by the viewer H. In a corresponding manner, video projectors C and D produce a stereo image intended for another viewer H' from video signals SR' and SL'. In a corresponding manner, the operation of the shutter means DC and DD is, according to the invention, synchronized with the operation of the shutters C', D' of the shutter glasses G' worn by the viewer H'. The operation of the shutter means DA, DB, DC, DD and the shutters A', B', C', D' of the shutter glasses is synchronized with each other and, naturally, also with the operation of the projectors A, B, C, D, as shown in the table 1 below:

TABLE 1

Synchronization of shutter means in FIG. 5.

| row | DA | DB | DC | DD | A' | B' | C' | D' |
| --- | --- | --- | --- | --- | --- | --- | --- | --- |
| 1. | open | shut | shut | shut | open | shut | shut | shut |
| 2. | shut | open | shut | shut | shut | open | shut | shut |
| 3. | shut | shut | open | shut | shut | shut | open | shut |
| 4. | shut | shut | shut | open | shut | shut | shut | open |

In the application of synchronization according to Table 1, viewers H and H' can both be shown their own stereo images, which stereo image may, for example, take into account the different positions of the viewers H, H' in relation to the projection surface S, wherein the viewers H and H' see an object IM from different angles.

When the synchronization of the stereo image is used, for example, to create a virtual space, it will be possible, by using the method according to the invention, to show each viewer a different high-quality stereo image, which stereo image may, for example, represent the same object/view, but taking into account the viewer's different position in relation to the image/object projected to them. Naturally, it is obvious that the system producing the stereo image should thus know the positions of the viewers H, H' in relation to the projection surface S.

If necessary, the synchronization shown in Table 1 can also be changed in such a way that the table can also be scanned through, row by row, in another order than in the order 1, 2, 3 and 4. The synchronization can be performed, for example, in the row order 1, 3, 2, 4 or 1, 4, 2, 3. By this method, it is possible to reduce the flicker of the image perceived by a single viewer H or H'.

Figure 6:
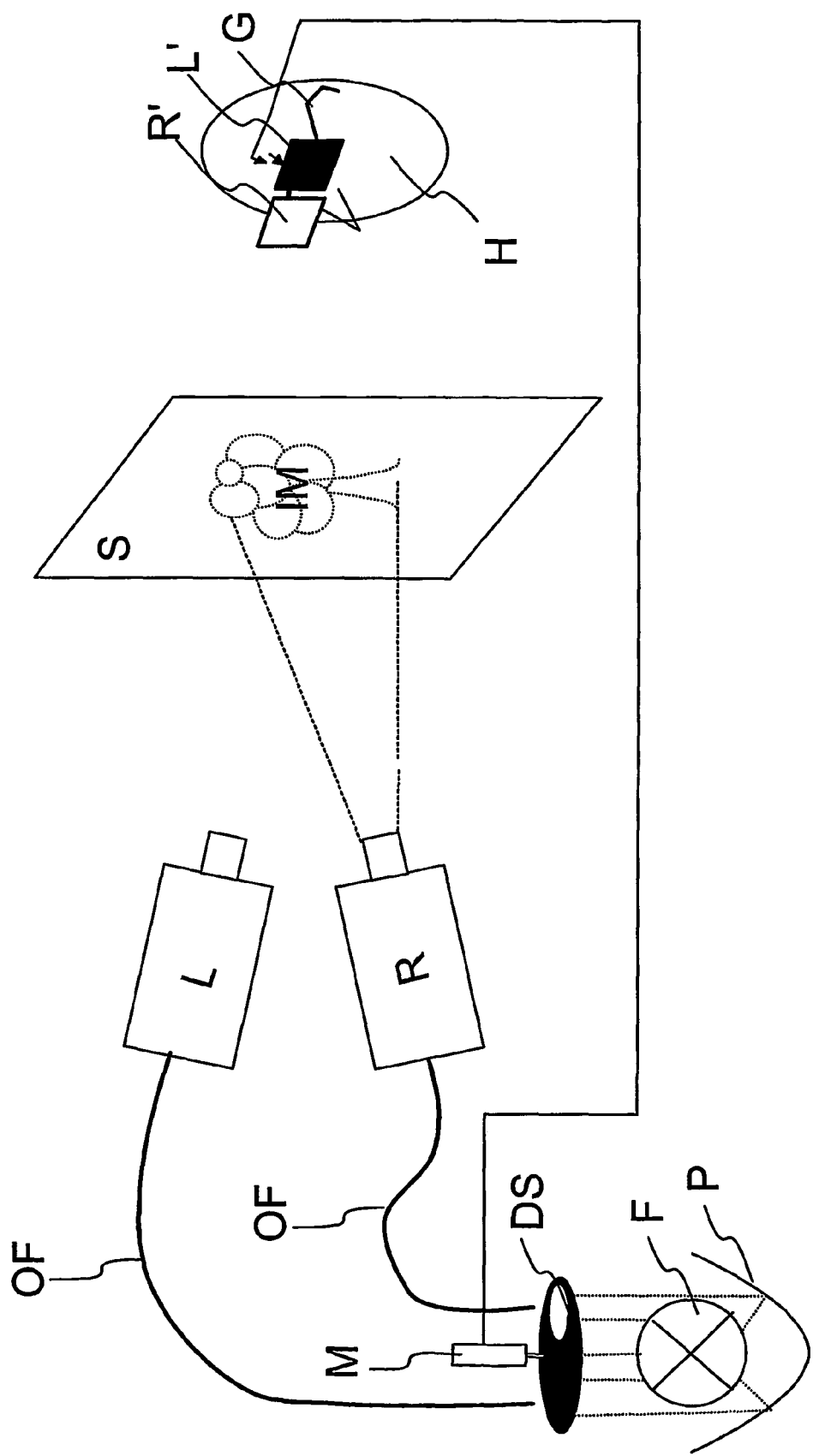
FIG. 6 illustrates an embodiment of the invention, in which the respective light sources of the video projectors are replaced with a light conductor and a light source outside the projectors.

Finally, FIG. 6 shows, in principle, an embodiment of the invention in which the respective internal light sources of the video projectors R, L are replaced with light conductors OF, which light conductors are arranged to conduct light to the projectors from a separate light source F placed outside said projectors. The light source F may be, for example, a continuously operating halogen or gas discharge lamp to produce good luminosity. In connection with the light source F, an inexpensive reflector P and/or other optics is used (not shown in FIG. 6) to collect and focus the light from the light source F with a good efficiency to the light conductor/conductors OF.

This embodiment has the advantage that by using light conductors OF, it is possible to convey light from one light source F to several projectors, and the shutter function according to the invention can be easily arranged in connection with said separate light source F, for example by using a solution based on a mechanical rotating disc.

As the light conductors OF, it is possible to use quartz or plastic based optic fibres or fibre bundles formed of them. Quartz based optic fibres have the advantage of good thermal stability which is significant when light with a high luminance is to be coupled to the end of the fibre bundle. It is also possible to use liquid filled light conductors.

For a person skilled in the art, it will be obvious that the coupling of light from a light source F to the light conductors OF can be provided with a variety of ways implementing the shutter function of the invention. Instead of the embodiment of FIG. 6, the guidance of light between different light conductors OF can be implemented, for example, by using a rotating or oscillating mirror (mirrors). To implement the actual shutter function, it is also possible, in addition to various mechanical solutions, to use for example liquid crystal shutters or the like.

By using light conductors OF, it is also possible to supply light to more than two video projectors by using one continuously operated light source F. Using light conductors, it is thus possible to implement, for example, the system intended for several viewers H, H', as shown in FIG. 5 in principle. Thus, a significant advantage achieved by using light conductors is that the structure of single projectors becomes simpler, wherein the overall apparatus becomes simpler and less expensive to implement. Leaving out individual light conductors from single projectors makes it also possible to implement projectors with a very compact size.

It is obvious that the above-described different embodiments of the invention can be combined to produce various embodiments of the invention which comply, as such, with the spirit of the invention. Therefore, the above-presented examples must not be interpreted as restrictive to the invention, but the embodiments of the invention can be freely varied within the scope of the inventive features presented in the claims hereinbelow.

Naturally, it will be obvious that even though the viewer H, H' in the above-presented examples is placed on the other side of the projection surface S than the projectors used for projecting a stereo or multi-channel image, it is conventional, in practice, that both these projector apparatuses and the viewers are placed on the same side in relation to the projection surface S. Instead of a conventional screen, the image can also be projected on other stationary or non-stationary surfaces which are suitable for the purpose.

The synchronization of shutter glasses G worn by the viewer can be advantageously implemented by using wireless communication means, for example radio frequency and infrared links, which are known as such from prior art, wherein the movement of the viewer is not limited by wiring etc. to be otherwise connected to the shutter glasses G.

Naturally, it is obvious that also the mechanical shutter disc DS or the like can be placed inside a single video projector, if necessary. In this case, however, one loses the advantage of avoiding the need to modify the projectors themselves by placing the shutter disc DS or the like in front of the projectors.

The shutter function according to the invention can also be applied in connection with other video projectors than those mentioned in the examples and based on the liquid crystal matrix. In view of the invention, another advantage of liquid crystal matrix video projectors, in addition to their inexpensive price, is that contrary to matrices which are refreshed and controlled row by row, the image formed by the liquid crystal matrix involves no significant scanning to update the image and recur in time. When such a phenomenon occurs, it should be taken into account in the arrangement of the scheduling of the shutter according to the invention.

In a summary, it can be stated that the invention makes it possible to project a high-quality stereo or multi-channel image by using two or more separate video projectors, which operate at the normal image frequency and are inexpensive as such, and shutter glasses. To provide a corresponding image quality according to the prior art requires, in practice, the use of a special stereo image projector which is based on the CRT technology and is significantly more expensive.

The invention claimed is:

1. An apparatus for projecting a moving or still stereo or multichannel image, comprising:
at least a first and at least a second video projector for projecting electronic image material intended for the left and the right eye of the viewer alternately in time by means of a video signal and in synchronization with the function of shutter glasses worn by the viewer, wherein said video projectors are provided with a shutter means/several shutter means to prevent the projection of the image, if necessary, the control of said shutter means being arranged in synchronization with the showing of the images in such a manner that
when the right-eye shutter of the shutter glasses worn by the viewer is open, the shutter means in connection with at least the second projector projecting the image intended for the left eye is/are shut, and correspondingly,
when the left-eye shutter of the shutter glasses worn by the viewer is open, the shutter means in connection with at least the first projector projecting the image intended for the right eye is/are shut.

2. The apparatus according to claim 1, wherein said shutter means is/are arranged outside the video projectors on the travel path of light in the area between said projectors and the projection surface used for showing the image.

3. The apparatus according to claim 1, wherein said shutter means is/are arranged outside the video projectors on the travel path of light immediately in front of said video projectors.

4. The apparatus according to claim 1, wherein said shutter means is/are arranged in connection with the video projectors, inside the housing of said video projectors on the travel path of the light emitted by an inner light source of the projector.

5. The apparatus according to claim 1, wherein an inner light source of the video projector is a light conductor, which light conductor is arranged to conduct light of an external light source to the video projector to project an image, and said shutter means is/are arranged in connection with said light conductor.

6. The apparatus according to claim 1, wherein said shutter means is/are means effecting the shutter function by means of a mechanical movement.

7. The apparatus according to claim 6, wherein an opaque disc that is rotated in a synchronized manner is used as a shutter member, said disc containing one or more light-permeable apertures.

8. The apparatus according to claim 6, wherein the apparatus is arranged to show two or several viewers a stereo image in such a manner that each viewer is shown a different image.

9. The apparatus according to claim 6, wherein the video projectors used in the apparatus are liquid crystal projectors based on the use of a liquid crystal matrix.

10. The apparatus according to claim 1, wherein said shutter means is/are electro-optical shutter means.

11. The apparatus according to claim 10, wherein said shutter means is/are liquid crystal shutters based on the absorption, dispersion or reflection of light.

12. The apparatus according to claim 10, wherein the apparatus is arranged to show two or several viewers a stereo image in such a manner that each viewer is shown a different image.

13. The apparatus according to claim 10, wherein the video projectors used in the apparatus are liquid crystal projectors based on the use of a liquid crystal matrix.

14. The apparatus according to claim 1, wherein the apparatus is arranged to show two or several viewers a stereo image in such a manner that each viewer is shown a different image, if necessary.

15. The apparatus according to claim 1, wherein the video projectors used in the apparatus are liquid crystal projectors based on the use of a liquid crystal matrix.

16. An apparatus for projecting a moving or still stereo or multichannel image, comprising:

at least a first and at least a second video projector for projecting images intended for the left and the right eye of the viewer alternately in time and in synchronization with the function of shutter glasses worn by the viewer, wherein said video projectors are provided with a shutter means/several shutter means to prevent the projection of the image, if necessary, the control of said shutter means being arranged in synchronization with the showing of the images in such a manner that when the right-eye shutter of the shutter glasses worn by the viewer is open, the shutter means in connection with at least the second projector projecting the image intended for the left eye is/are shut, and correspondingly, when the left-eye shutter of the shutter glasses worn by the viewer is open, the shutter means in connection with at least the first projector projecting the image intended for the right eye is/are shut wherein an inner light source of the video projector is a light conductor, which light conductor is arranged to conduct light of an external light source to the video projector to project an image, and said shutter means is/are arranged in connection with said light conductor.

* * * * *